H. D. BOUGHTER.
MOVABLE HEADLIGHT.
APPLICATION FILED FEB. 19, 1921.

1,422,732.

Patented July 11, 1922.
2 SHEETS—SHEET 1.

WITNESS:

H. D. Boughter
INVENTOR
BY Victor J. Evans
ATTORNEY

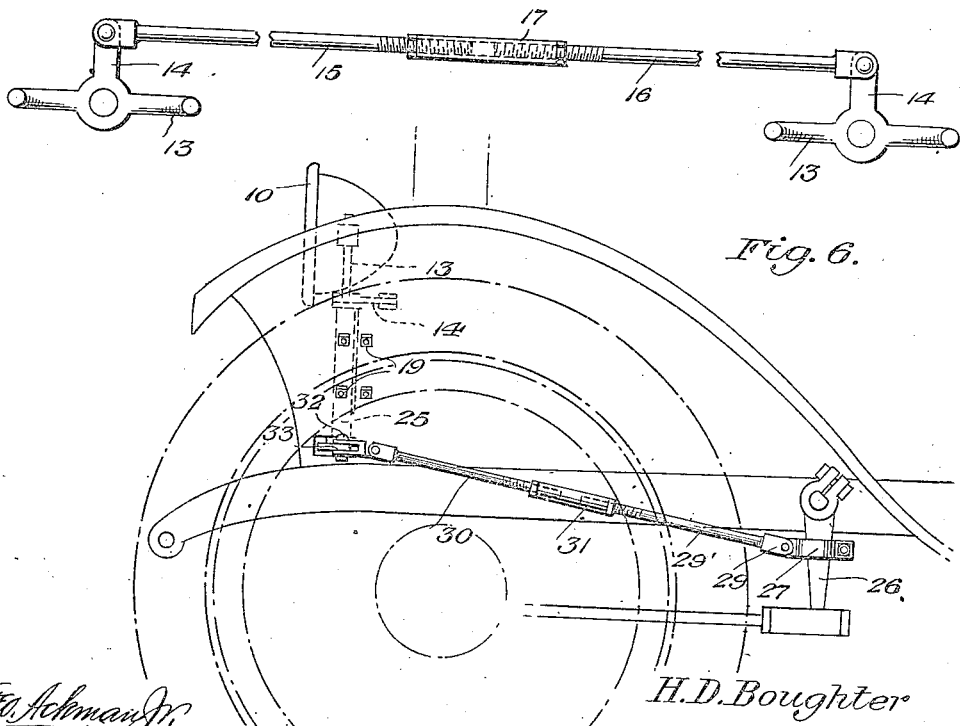

UNITED STATES PATENT OFFICE.

H. DIXON BOUGHTER, OF DECATUR, ILLINOIS.

MOVABLE HEADLIGHT.

1,422,732. Specification of Letters Patent. Patented July 11, 1922.

Application filed February 19, 1921. Serial No. 446,357.

*To all whom it may concern:*

Be it known that I, H. DIXON BOUGHTER, a citizen of the United States, residing at Decatur, in the county of Macon and State of Illinois, have invented new and useful Improvements in Movable Headlights, of which the following is a specification.

This invention relates to headlights for motor vehicles, and comprehends the provision of means for mounting said headlights for simultaneous oscillatory movement controlled by the steering mechanism, so that the light rays are always maintained directly in advance of the course pursued by the vehicle, thereby reducing the dangers and inconveniences of night driving to a minimum.

The invention embodies a bracket of normal construction whereby any size automobile headlight may be used, and making it possible to use the headlights with which the vehicle is already equipped, the construction of the bracket and supporting means being such as to firmly support the headlight in an upright position, eliminating vibratory movements which are frequently caused by the swinging and swaying of the car body.

The nature and advantages of the invention will be better understood when read in connection with the accompanying drawings, the invention residing in the combination, construction and arrangement of parts as claimed.

In the drawings forming part of this application, like numerals of reference indicate similar parts in the several views and wherein:

Figure 4 is a view partly in section, showing the connection between the steering mechanism and the movable headlight.

Figure 5 is a plan view of the adjustable connection between the respective headlights.

Figure 6 is a side elevation of a portion of the motor vehicle showing the invention applied thereto.

Figure 1:
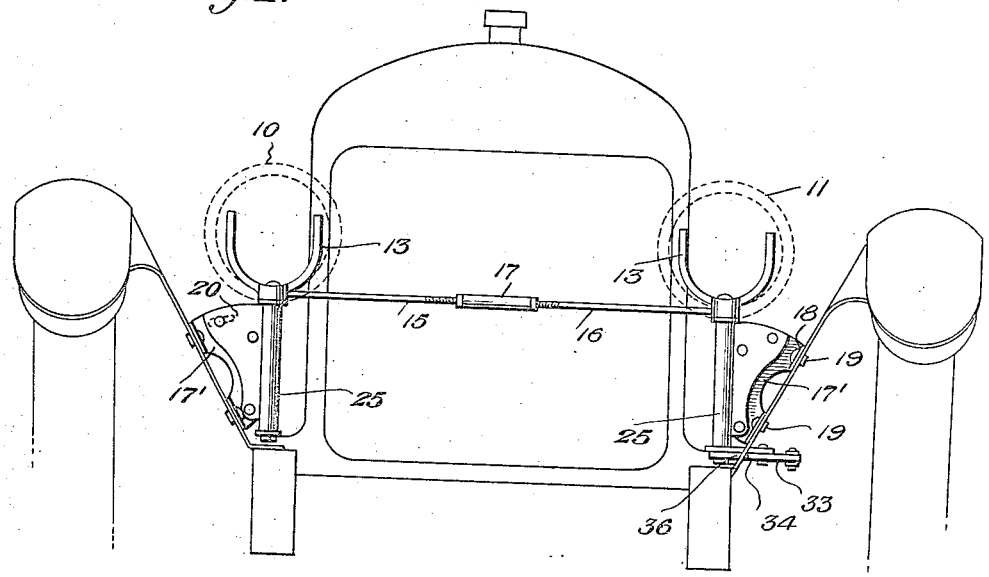
Figure 1 is a front view of a motor vehicle showing the headlights mounted in accordance with the present invention.
Figure 2:
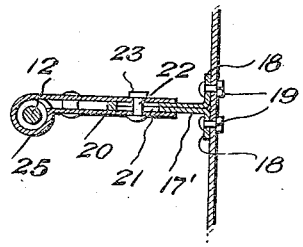
Figure 2 is a view in elevation on an enlarged scale of the headlight supporting means including the adjustable bracket.
Figure 3:
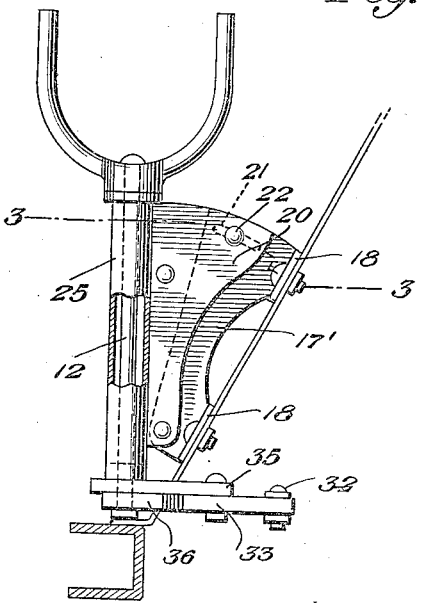
Figure 3 is an enlarged sectional view taken on line 3—3 of Figure 2.

Referring to the drawings in detail, 10 and 11 indicate respectively the headlights of a motor vehicle which are supported on the standards 12 each of the latter being equipped with a fork 13 which is associated with the adjacent headlight in the usual wellknown manner. Each fork is provided with an extension 14, these extensions being connected together by a transverse rod made up of two sections indicated at 15 and 16 respectively, the adjacent extremities being oppositely threaded and adjustably connected together by means of a turnbuckle or the like 17. Manifestly, the length of the connecting rod can be varied as found necessary. By reason of the fact that the headlights are connected by means of this transverse rod, both of said headlights are associated for simultaneous oscillatory movement with a view of maintaining the light rays always in advance of the machine, irrespective of the course pursued by the latter.

The standards 12 are mounted in brackets which are secured to the fenders of the vehicle as illustrated in Figure 1. Each of these brackets embodies a fixed member 17' which is formed with attaching ears 18 and secured to the adjacent portion of the fender by means of fastening elements 19. This fixed member 17' projects from the fender in the direction of the radiator of the vehicle, and is received by the member 20 of the bracket which is telescopically fitted on the member 17'. The member 20 is provided with a slot 21 which receives a threaded element 22 carried by the member 17', the threaded element having associated therewith a nut 23. Obviously, the member 20 of the bracket can be adjusted toward or away from the member 17' so that lamps of any size may be utilized, the respective members of the bracket being held fixed relatively by means of the bolt and nut indicated at 22 and 23. The member 20 of the bracket terminates to provide a tubular portion 25 which receives the standard 12 of the adjacent headlight, the standard being mounted for partial rotation in the tubular portion so that the headlights can be turned either to the right or to the left when the machine rounds a curve.

The headlights are controlled by the steering mechanism of the vehicle of which the arm 26 forms a part. Associated with this arm is a clamp 27 formed with an extension 28 which is received by the bifurcated extremity 29 of a rod which projects forwardly from the arm 26. This rod has pivotal connection with the extension 28, and is preferably made up of two sections 29' and 30 respectively, the adjacent extremities of these sections being oppositely threaded and adjustably connected by means of a turn-buckle 31, so that the length of the rod may be varied when desired. The outer end of the rod has pivotal connection as at 32 with an extension 33 formed on a toothed segment 34, the latter being pivoted on a horizontally disposed plate 35 which is secured to the lower end of the bracket. The standard 12 of the adjacent headlight passes through this plate and has fixed thereon a toothed segment 36 which meshes with the segment 34.

Manifestly, when the arm 26 is moved forwardly or rearwardly incident to the steering of the vehicle, the rod associated with the clamp 27 is reciprocated. When this rod is moved forwardly, the segments 34 and 36 are actuated so as to turn the headlights to the left for the purpose of maintaining the light rays in advance of the vehicle when turning the latter in the direction mentioned. When the rod is moved to the rear the headlights are turned to the right for the same purpose. In the normal position of the parts the headlights are of course maintained in the straight away position. The light rays are therefore always maintained in advance of the vehicle irrespective of the course the latter pursues, and therefore materially reduces the danger of night driving, while any make of machine can be properly equipped with the mechanism forming the subject matter of the invention without making any alterations to the machine.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:

1. Dirigible headlights for motor vehicles comprising lamp supporting standards, a connection between the lamps whereby the latter are simultaneously rotated, a bracket for each lamp, said bracket including a wing shaped member fixed to the adjacent fender of the vehicle, a second wing-like member relatively adjustable to the first mentioned member, means for holding the adjustable member fixed in a given position, the latter mentioned member being formed to provide a bearing arranged along the outer side thereof and in which the adjacent lamp standard is mounted for partial rotation, and means whereby said standards are turned incident to the steering of the vehicle for the purpose specified.

2. Dirigible headlights for motor vehicles comprising lamp supporting standards, a connection between said lamps whereby the latter are simultaneously rotated, a bracket for each standard, said bracket including a wing-like member fixed to the adjacent fender, a second wing-like member telescopically receiving the first mentioned member, the second mentioned member being formed to provide a tubular portion disposed along one edge of said member and in which the adjacent lamp standard is mounted for partial rotation, means for holding said wing-like members fixed relatively, and means whereby said standard is turned incident to the steering of the vehicle for the purpose specified.

3. Dirigible headlights for motor vehicles comprising lamp supporting standards, a connection between said lamps whereby the latter are simultaneously rotated, a bracket for each standard, said bracket including a wing-shaped member secured to the adjacent fender, a movable member formed to provide an intermediate tubular portion in which the adjacent standard is mounted for partial rotation, and spaced end members between which the fixed member is arranged, means for holding said movable member fixed with relation to the first mentioned member, and means whereby said standards are turned incident to the steering of the vehicle for the purpose specified.

In testimony whereof I affix my signature.

H. DIXON BOUGHTER.